Feb. 17, 1942.　　　J. A. MEISTER　　　2,273,583

TROLLEY CONVEYER

Filed July 30, 1940　　　6 Sheets-Sheet 1

Fig. 1

Feb. 17, 1942. J. A. MEISTER 2,273,583
TROLLEY CONVEYER
Filed July 30, 1940 6 Sheets-Sheet 3

Inventor
Julius A. Meister
By Arthur M. Hahn
Attorney

Feb. 17, 1942. J. A. MEISTER 2,273,583
TROLLEY CONVEYER
Filed July 30, 1940 6 Sheets-Sheet 5

Patented Feb. 17, 1942

2,273,583

UNITED STATES PATENT OFFICE 2,273,583

TROLLEY CONVEYER

Juluis A. Meister, Ellwood City, Pa., assignor to Mathews Conveyer Company, Ellwood City, Pa., a corporation of Pennsylvania Application July 30, 1940, Serial No. 348,562

13 Claims. (Cl. 214—60)

This invention relates to conveyer systems and more particularly to trolley conveyer systems that are adapted to distribute material from a loading station to one of any number of work stations where it is discharged. In the particular embodiment of the invention which is herein illustrated, the conveyer system is of the continuous type providing for the return of the empty carrier to the loading station after the load has been discharged. However, it is obvious, as will subsequently appear, that the invention may be used in other types of conveyer systems.

The main object of the invention is to provide a conveyer system having a carrier with an improved means for automatically discharging the load from the carrier.

Another object of the invention is to provide an improved means for selecting the particular work station where the material is to be automatically discharged.

A further object of the invention is to provide an improved means for automatically discharging the material at a predetermined work station.

A still further object of the invention is to provide an automatic means for rendering the discharge mechanisms on the carrier and at a work station inoperative after a load has been discharged.

Other objects and advantages of the invention will be readily understood from the following description and accompanying drawings wherein like numerals designate like parts throughout the several views.

The conveyer comprises an overhead track 1, having a cross section similar to the well known I beam, which is usually suspended from the ceiling but may be supported in any suitable manner. The invention contemplates the use of any number of carriages similar to the one designated in the drawings generally by the letter A which has a frame consisting of two top beams 2 preferably formed of angle iron and secured to channel side pieces 3. Mounted between the top beams 2 is a plate 4 which is pivotally supported at 5 between bifurcated ends 6—6 of a suspension member 7. Secured to the opposite end of the suspension member 7 are arms 8—8, having axles 9 which hold wheels 10 in position to roll along the track 1. The carriage A is pulled along the track 1 by a chain 11 (Fig. 5) which is fastened to the suspension member 7 at 12 and caused to move in the direction of the arrow by some suitable source of power, not shown.

A carrying tray, designated generally by the letter B, is adapted to support a skip or tote box 13 loaded with the material to be distributed, and this tray consists of channel shaped vertical side pieces 14, and a cross-rod 15 extending between the vertical side pieces 14 to support two horizontal side pieces 16. The parts of the tray are preferably welded together, but may be secured in any well known manner to form a rigid structure. Brackets 17 and 18 extending toward the inside of the tray B are mounted on the front and rear ends respectively of each of the horizontal side pieces 16 to prevent the skip 13, which is carried on the horizontal flanges of the side pieces, from sliding off.

Figure 3:
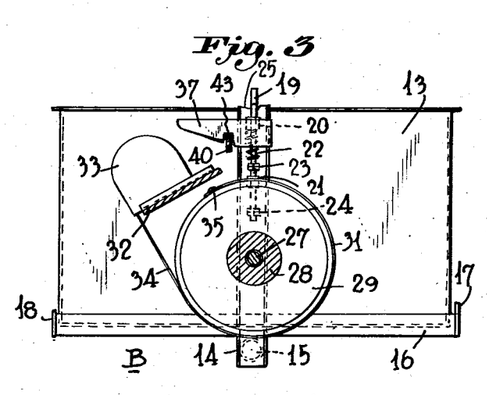
Figure 3 is a partial vertical section on the line 3—3 of Figure 1 shewing the latch mechanism on a carrier.

To securely hold the skip on the tray, holddown clamps 19 (Fig. 3), are slidably and rotatably mounted in collars 20 and 21 on each of the vertical side pieces 14. A compression spring 22 placed between the collar 20 and nut 23 serves to force the clamp 19 downwardly onto the top of the skip 13. Keeper nuts 24 are placed on the lower ends of the clamps 19 to limit the vertical movement when their position is being changed. Notches 25 are cut into the upper ends of the vertical side pieces 14 to permit the clamps to engage the skip 13. To prevent the clamps from swinging when not in use, they may be placed in notches 26 formed in the flanges of vertical side pieces 14 as clearly shown in Figure 1.

Axles 27 are rigidly mounted on each of the vertical side pieces 14 of the tray B and these axles are journaled in bearings 28 which are mounted on each of the side pieces 3 of the carriage A to rotatably support the tray. Wheels 29, each having a hub 30 and a crown or flanged periphery 31, are mounted on each of the axles 27 between the tray B and the carriage A, and are prevented from rotating on the axles by some suitable means such as keys seated in keyways in the axles 27 and hubs 30, respectively.

Figure 2:
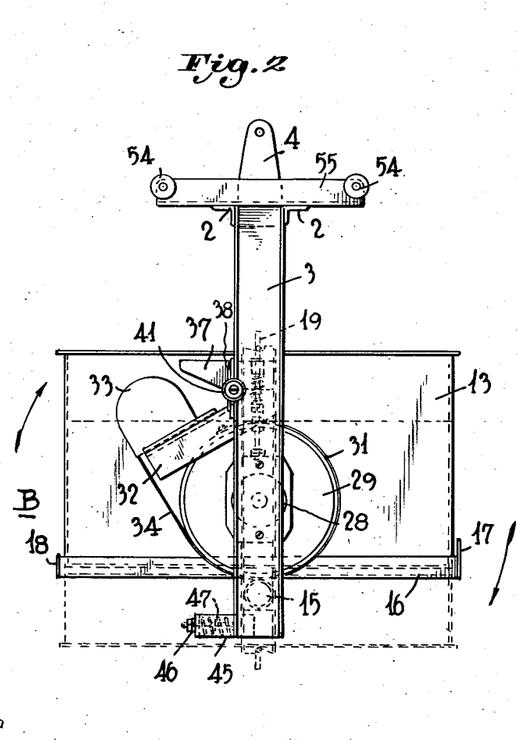
Figure 2 is a side elevation of a carrier as shown in Figure 1.

An L-shaped bracket 32 is mounted on each of the side pieces 3 of the carriage A to carry a Pullman spring balance 33 of the usual type having a flexible strap 34 encircling part of the wheel 29 and securely fastened thereto at 35. It will be readily seen that the tension of the spring 33 on the wheel 29 tends to rotate or tilt the tray B with respect to the carriage A in a clockwise direction as viewed in Figures 2 and 3. The spring balances 33 exert a force on the strap 34 which causes the tray to rotate at a substantially constant velocity except for the starting acceleration. Axles 29 are positioned to support the tray approximately at its center of gravity when loaded, so the springs 33 exert the only material force tending to rotate the tray. Thus, the angular velocity of the tray is determined solely by the force exerted by the springs 33.

Figure 1:
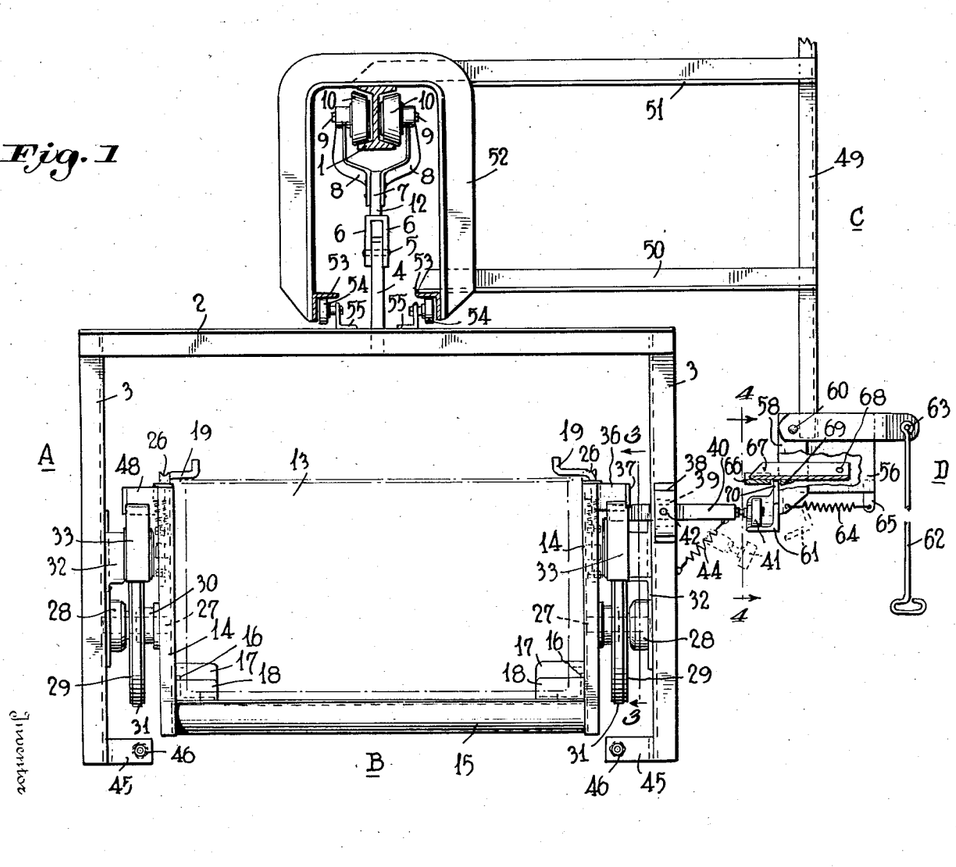
Figure 1 is a rear elevation of the conveyer with parts broken away showing a carrier approaching a work station.

As shown in Figure 1, a stud 36 is mounted on the vertical side piece 14 of the tray B to support a latch plate 37 (Figs. 2 and 3), between the carriage and the tray. A plate 38, shaped to form a slot 39, is mounted on one flange of the side piece 3 of the carriage A. Pivotally in the slot at 42 is an actuating bar 40 having a roller 41 journaled on one end thereof. When in a substantially horizontal position, the end of the bar 40 opposite to the roller 41 engages a notch 43 in the latch plate 37 and prevents rotation of the tray B. A tension spring 44, which is fastened between the bar 40 and the side piece 3 of the carriage A, tends to pull the roller end of the bar 40 downwardly. It will be readily seen that an upward movement of the roller 41 will disengage the opposite end of the bar 40 from the notch 43 and permit the tray B to be rotated by the tension of the Pullman spring balances 33.

On the lower portion of each of the side pieces 3 of the carriage A are mounted L-shaped brackets 45—45 which hold bolts 46 with compression springs 47 between the heads of the bolts 46 and the brackets 45. When the tray is rotated, the stud 36 and a similar stud 48, mounted on the opposite vertical side piece of the tray, engage the bolts 46 thereby limiting rotation of the tray B to approximately 180°. The compression springs 47 absorb the impact when the studs strike the bolts.

One work station designated generally by the letter C is shown in Figure 1 of the drawings, however any desired number may be used in connection with my invention. Each work station C has a frame, which may be suspended from the ceiling, consisting of an upright 49, angle iron beams 50 and 51 mounted thereon and supporting an inverted U-shaped bracket 52 having guide rails 53—53 horizontally mounted on the inner sides thereof. These guide rails 53 engage rollers 54 supported on top of the carriage A by L-shaped brackets 55 which are mounted on the beams 2. The engagement of the rollers 54 with the guide rails 53 prevents the carriage A from swinging on the pivot 5 thereby steadying the carriage and accurately guiding it past the work station C.

Figure 4:
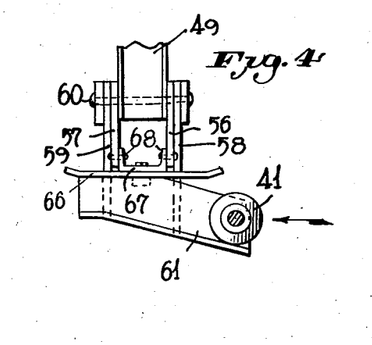
Figure 4 is an enlarged vertical section taken on the line 4—4 of Figure 1 showing the tripping mechanism at a work station.

A tripping mechanism designated generally by the letter D and clearly shown in Figures 1 and 4, is supported by plates 56 and 57 which are mounted on the flanges of the upright 49 near its lower end. This tripping mechanism D includes levers 58 and 59 pivotally secured to plates 56 and 57 by a pin 60. A tripping member in the form of an angle iron cam rail 61 is mounted on the vertical arms of levers 58 and 59 in the path of roller 41 and this cam rail is arranged at an angle inclined upwardly in the direction followed by the carriage A. An operating handle 62 is pivotally supported by a pin 63 which extends between the horizontally extending portions of the levers 58 and 59. A tension spring 64 which is fastened between the vertical arm of the lever 58 and a lug 65 on the plate 56 tends to pull the levers 58 and 59 and the cam rail 61 away from the path of the carriage A. As shown particularly in Figures 1 and 4, a latch rail 66, adapted to engage the upper surface of the roller 41, is mounted on one end of a channel shaped arm 67 which is pivotally supported between the inner sides of the plates 56 and 57 by pins 68—68. A small block 69 is secured to the bottom surface of the arm 67 and is so positioned that a notch 70 is formed between the latch rail 66 and the block 69. The vertical flange of the cam rail 61 is adapted to engage in this notch and thereby hold both the cam rail 61 and the latch rail 66 in operative position as shown in solid lines in Figure 1. It will be readily seen that the upward movement of the latch rail 66 will release the cam rail from the notch 70, permit the cam rail 61 to be pulled away from the path of the carriage A by the tension of the spring 64 and thus become located in an inoperative position as shown by dotted lines in Figure 1.

The operation of the apparatus set forth above may be briefly described as follows:

At a suitably located loading station, not shown, a skip 13 filled with material to be distributed, is placed on the tray B of one of the carriages A and secured thereon by turning the holddown clamps 19 to engage the top of the skip 13. The tray B is held in upright position by the engagement of the bar 40 in the notch 43, which also holds the bar 40 and the roller 41 in operative position as shown in full lines in Figure 1. The carriage A is then pulled along the track toward the various work stations C. When one of the work stations C is in need of material, the operator pulls the operating handle 62 which moves the cam rail 61 toward the path of the carriage A and to operative position where it is held by engagement with the notch 70 in arm 67. As the carriage A passes the work station, the guide rails 53 hold the carriage steady in a horizontal position by contacting the rollers 54 and the roller 41 engages the cam rail 61. As the roller 41 moves upwardly along the cam rail 61, it moves the opposite end of the bar 40 downwardly to disengage it from the notch 43, whereby the tension of the Pullman spring balance 33 causes the wheel 29 to rotate and invert the tray B so the material is discharged from the skip. The roller 41 then continuing its movement up the inclined cam rail 61 contacts the latch rail 66 and moves it upwardly, which releases it from notch 70 and permits the cam rail 61 to be pulled away from the path of the carriage A by the spring 64 to its inoperative position. After the carriage has passed the station, the spring 44 then pulls the roller 41 downwardly to its inoperative position as shown in dotted lines in Figure 1, and the carriage A continues along the track 1, with the tray B inverted, past other work stations C eventually returning to the loading station where the empty skip is removed, the tray B returned to its upright position and a loaded skip placed thereon. The roller 41 being in inoperative position prevents the latch bar 66 on the tripping mechanism at other work stations from being released as the empty carriage passes them. Likewise, at this station the cam rail being in inoperative position, does not trip the latch bar 40 on subsequent loaded carriages until additional material is required and the operator resets the tripping mechanism by pulling the operating handle 62.

The modification of the invention as illustrated by Figures 5 to 11 will now be described.

The structures of the conveyer track, the carriage A, and the tray B are substantially the same in this modification as those described above, the main difference being in the means for holding the skip 13 on the tray B and the automatic means for operating the discharge mechanism at a work station C.

Instead of the holddown clamps 19 and the brackets 18 previously described, the skip 13 is held in position on the tray by the permanently mounted arms 71 (Fig. 6) at the top of each of the vertical side pieces 14 and a turn button 72 which is pivotally secured to a brace 73 (Fig. 5) at the front end of the tray B. The turn button 72 is turned down while the loaded skip is slid on the tray B, then turned up and held in position by a spring 74 and a lug 75.

Figures 5, 10, 11:
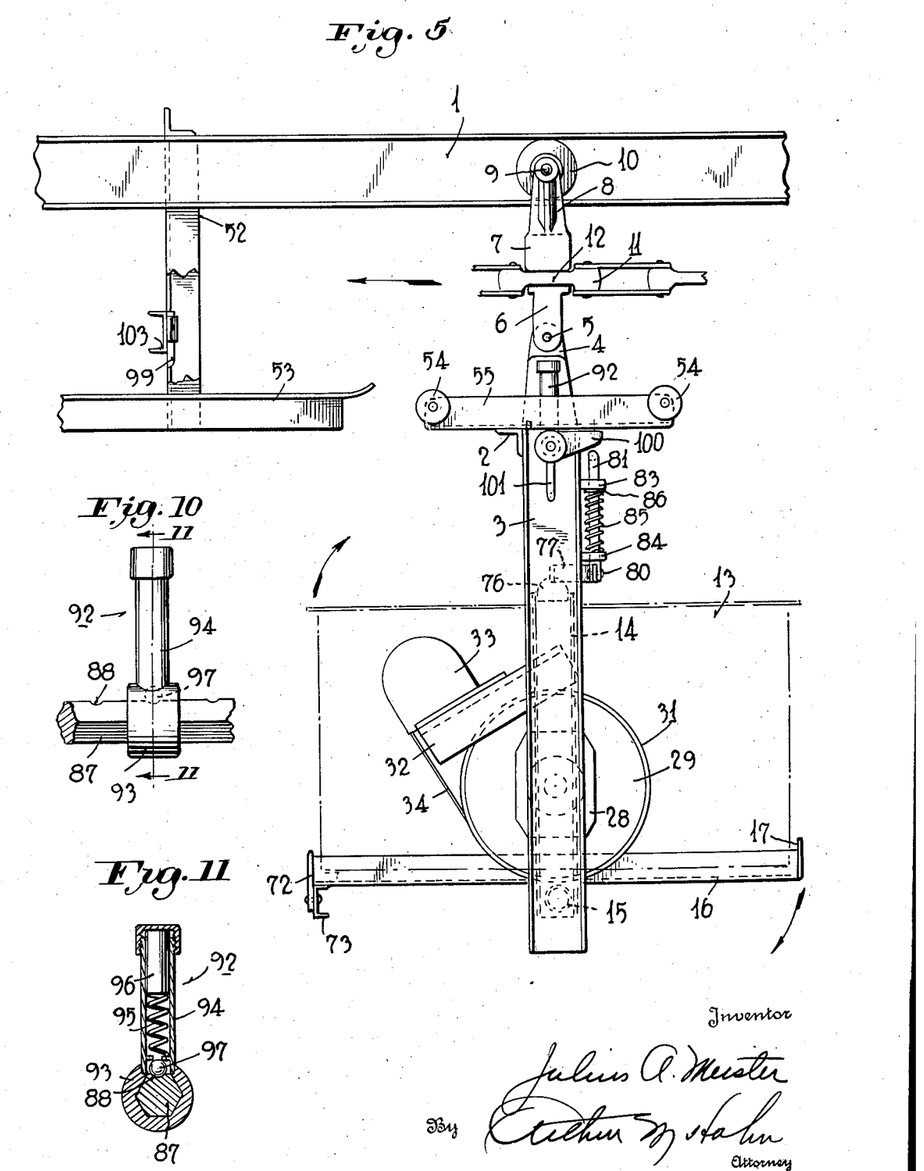
Figure 5 is a side elevation of a modified form of my invention showing a carrier approaching a work station.
Figure 10 is an enlarged elevation of a station selector.
Figure 11 is a vertical section of the station selector taken on the line 11—11 of Figure 10.
Figures 6, 7:
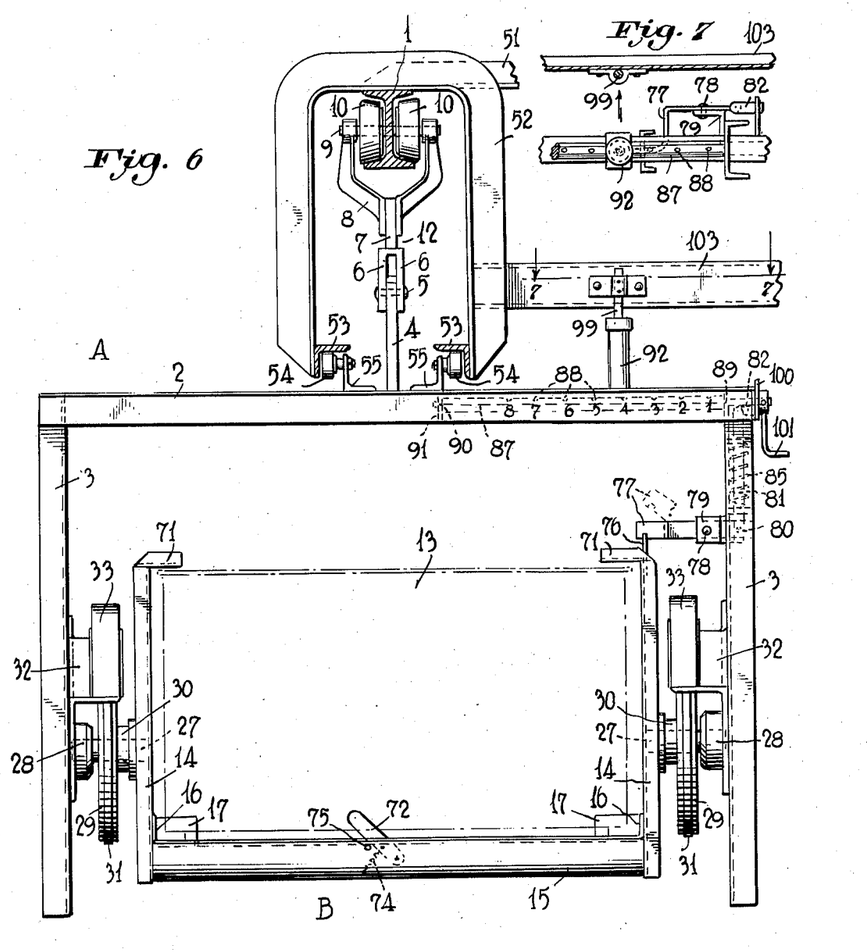
Figure 6 is a rear elevation thereof.
Figure 7 is a sectional view on the line 7—7 of Figure 6 showing the station selector and latch mechanism.
Figure 8:
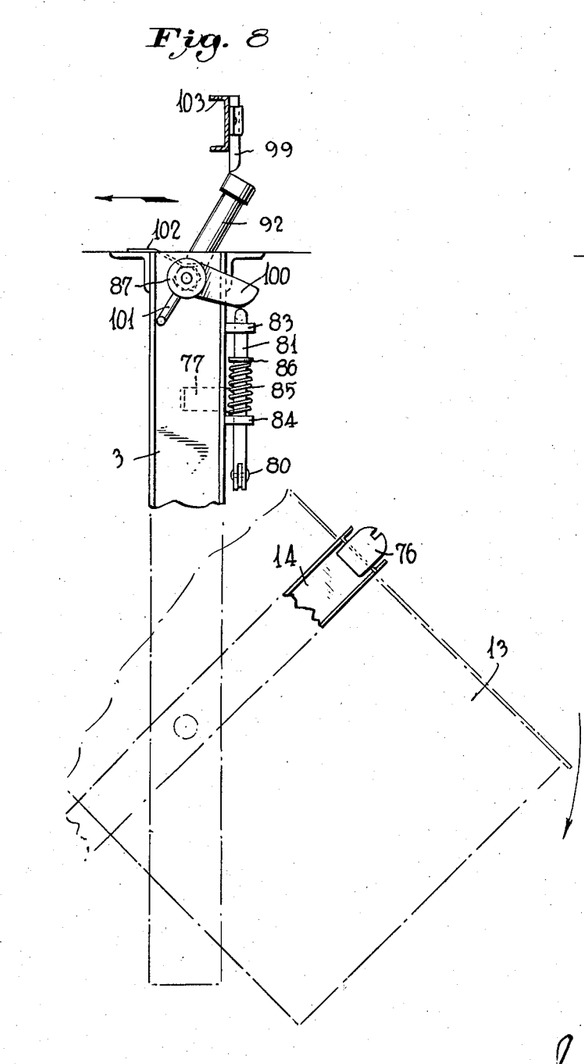
Figure 8 is an enlarged view of the station selector on a carrier engaging a station tripper at a work station.

Mounted at the upper end of the vertical side piece 14 of the tray B is a latch 76 to hold the tray in an upright position when engaged with a bar 77 pivotally secured at 78 to a bracket 79 which is attached to the side piece 3 of the carriage A. Pivotally connected with the bar 77 at 80 is a rod 81 formed with an offset arm 82 at its upper end (Fig. 7). As shown in Figure 5, this rod is slidably mounted in collars 83 and 84 which are secured to a flange of the side piece 3 of the carriage A. The rod 81 is normally forced upwardly by a compression spring 85 positioned between the collar 84 and a shoulder 86 on the rod 81.

As shown particularly in Figure 6, a hexagonal rod 87, formed with a number of indentations 88 longitudinally spaced along one face thereof, has one end 89 journaled in the side piece 3 and its other end 90 journaled in a plate 91 which is attached to one of the brackets 55. An actuating member in the form of a station selector 92 as clearly shown in Figures 10 and 11, consists of a collar 93 slidably mounted on the hexagonal rod 87, a capped tube 94 containing a plunger 96 and a spring 95 to hold a ball 97 in engagement with any selected one of the indentations 88. The station selector 92 causes the rod 87 to rotate when it contacts a tripping member 99 that is supported at a work station.

As the rod 87 is rotated, a cam 100 rigidly mounted on the end thereof engages the arm 82 of the rod 81 and forces the same downwardly which causes the bar 77 to become disengaged from the latch 76 thereby permitting the tray B to be rotated by the Pullman spring balance 33. A handle 101 (Fig. 6) is rigidly mounted on the outside end of the rod 87 so it may be turned to any desired position where it is held by a leaf spring 102 (Figures 8 and 9) which engages one of the faces of the hexagonal rod.

The tripping member 99 for each work station is so positioned on a support 103 that it will only engage the station selector 92 when the selector is set at the indentation 88 on the rod 87 corresponding to that particular work station.

Figure 9:
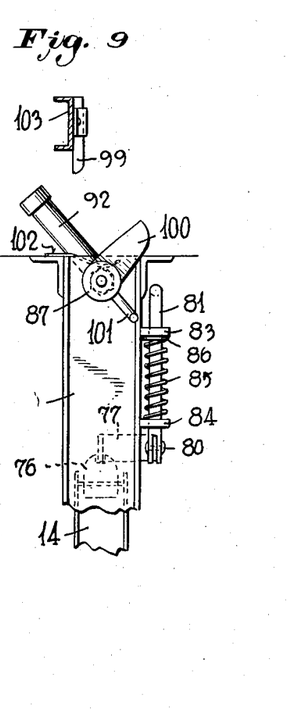
Figure 9 is an enlarged view showing the station selector in inoperative position as it passes a station tripper.

In the operation of this modified form of conveyer, the skip 13 is placed on the tray B at the loading station and the turn button 72 is set to prevent the skip from sliding off. The station selector 92 is moved to the indentation 88 corresponding to the work station where the material is to be discharged. The carriage is pulled along the track 1 and passes all work stations until the station selector engages the tripping member 99 as shown in Figure 9, at the station for which it is set. When this engagement takes place, the tray is inverted by the tension of the Pullman spring balance 33 and the carriage A continues along the track 1 with the tray in inverted position. At some point just preceding the loading station, the handle 101 contacts a projection (not shown) which throws the station selector to inoperative position as shown in Figure 9. The skip is then removed and the tray manually turned and locked in its upright position. While the station selector 92 is in inoperative position the carriage with the upright tray may continue past the loading station and all work stations without the latch mechanism being released by a station tripper 99. When another skip is placed on the tray at the loading station, the rod 87 is turned so the selector will be in operative position and the station selector 92 is set at the indentation corresponding to the particular work station at which the load is to be discharged.

Where a large number of work stations are used, it is obvious that additional positions for the station selector may be provided by extending the hexagonal arm 87 to the opposite side of the carriage A and that multiples of the number of stations thus provided for may be added by varying the height of the station selector 92.

Figures 12, 13:
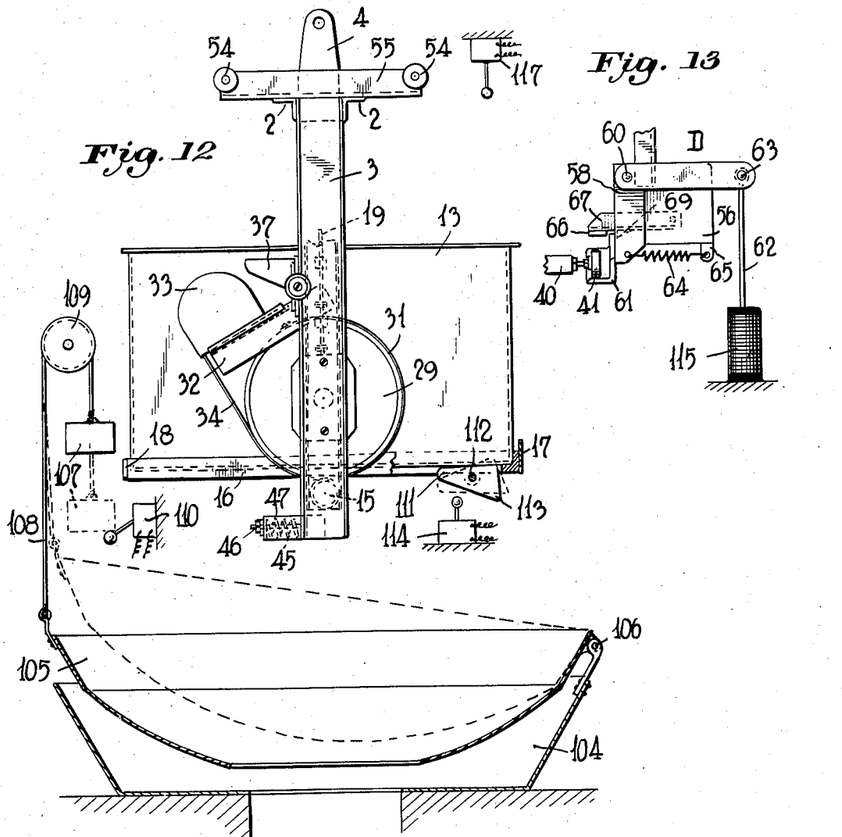
Figure 12 is a side elevation with parts broken away of another modified form of my invention.
Figure 13 is a rear elevation of the tripping mechanism used therewith.
Figure 14:
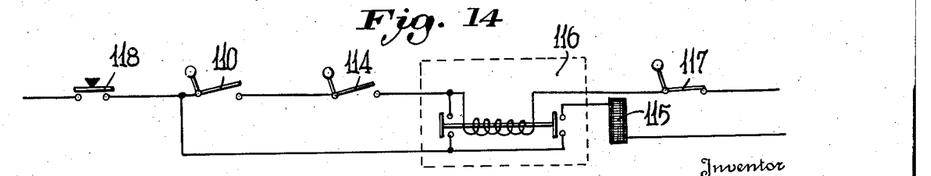
Figure 14 is a schematic wiring diagram of the electrical circuit in this modification.

In another modified form of my invention as shown in Figures 12 to 14 of the drawings, the operation of the conveyer is substantially the same as that shown in Figures 1 to 4 except that automatic means are used to set the station tripping mechanism D instead of the operating handle 62.

In this form of my invention, the material unloaded from the skip 13 is received at each work station by a main hopper 104 which contains a floating hopper 105 hinged on one side at 106 and supported on the other side by a counterweight 107 connected to the floating hopper by a cord or cable 108 that passes over a pulley 109. When the material contained in the floating hopper 105 reaches a certain predetermined minimum, the resulting reduction in the weight of the material permits the floating hopper 105 to be raised by the counterweight. As the floating hopper reaches its uppermost position, the counterweight 107 engages and closes a normally open limit switch 110.

Each carriage A has a lever 111 pivotally supported by a rod 112 mounted transversely between the horizontal side pieces 16 of the tray B. The lever 111 has a projection 113 arranged to engage and close a normally open limit switch 114 when the tray has a loaded skip thereon, as shown in full lines in Figure 12. When the tray is not loaded, the lever 111 will move to inoperative position, as shown in dotted lines in Figure 12, either by its own weight or by a spring (not shown) which may be connected to the lever 111 or to the rod 112 in any suitable manner.

A solenoid 115 has its core connected to the operating handle 62 which is pulled downwardly to set the cam rail 61 of the tripping mechanism D in operative position when the solenoid is energized.

As shown in the wiring diagram in Figure 14, limit switches 110 and 114 are connected in series so both switches must be closed in order to energize the solenoid. Thus, when the material in the hopper reaches a predetermined minimum, the counterweight closes limit switch 110, but only when a loaded carriage approaches the work station and the lever 111 closes limit switch 114 will the solenoid be energized and set the tripping mechanism in operative position. It is obvious, therefore, that empty carriages will pass the work station without being inverted even though limit switch 110 is closed, and that loaded carriers will pass the work station without being unloaded unless the material in the hopper has reached a predetermined minimum.

When limit switches 110 and 114 are both closed, an electrical interlock 116 is operated which keeps the solenoid energized until the circuit is broken. A normally closed limit switch 117 is supported in the path of the carriage A so it will be engaged and opened by some part of the carriage, such as the top beams 2, after the material has been unloaded, whereby the circuit is broken and the tripping mechanism is returned to inoperative position.

A master switch 118 is included in each circuit which may be opened manually so the tripping mechanism D will remain in inoperative position and thus prevent a load from being discharged when a particular work station is not in operation.

With this form of my invention it is also possible to predetermine the work stations at which the material will be unloaded. This may be accomplished by sliding the lever 111 transversely along the rod 112 and arranging the limit switches 114 for the various work stations to be operated only when the lever 111 is in a certain position on the rod 112. This arrangement is particularly applicable to conveyer systems wherein different types or grades of materials are used at the various work stations. The limit switches 114 are placed at a point transversely of the conveyer in accordance with the particular type of material used at the respective work stations. When the carriage is loaded, the lever 111 is moved to a position on the rod 112 so it will only engage the limit switches 114 at those work stations using the particular material with which the carriage is loaded. Thus, the carriage will move along the track without being unloaded until it reaches a station which is using the particular material contained in the load and at which the material in the hopper has reached a certain minimum.

It is obvious that those skilled in the art may vary the details as well as the precise parts without departing from the invention. It is also obvious that any of the different elements of the invention disclosed in the foregoing illustrations may be interchanged without departing from my invention. While these illustrations disclose the invention with a tray carrying a skip or tote box, it is obvious that any type of container may be substituted therefor. As may be readily seen some elements of the invention are adaptable to conveyers which are not of the trolley type.

What I claim is:

1. A conveyer comprising a movable carriage, a load carrying means supported by said carriage and movable with respect thereto, a spring connected between said carriage and said load carrying means for positively inverting said load carrying means with respect to said carriage to discharge a load therefrom, and latch means for normally retaining said load carrying means in load supporting position, said spring acting to hold said tray in inverted position after the material has been discharged.

2. A conveyer comprising a movable carriage, a load carrying tray rotatably supported by said carriage, a container of material detachably connected to said tray, a spring mounted on said carriage and connected to said tray and adapted to positively invert said tray with respect to said carriage to discharge the material from said container, and a latch mechanism to normally prevent rotation of said tray, said spring acting to hold said tray in inverted position after the material is discharged from the container.

3. A conveyer comprising a movable carriage, a load carrying tray rotatably supported by said carriage, means for detachably holding a container on said tray, a spring mounted on said carriage and connected to said tray thereby tending to positively rotate said tray in said carriage to discharge a load, means to limit rotation of said tray to approximately 180°, said spring tending to hold said tray in rotated position, and a latch mechanism to normally prevent rotation of said tray.

4. A conveyer system including a track, a plurality of carriages movable on said track, means for propelling said carriages along said track, each of said carriages including a load carrying tray rotatably supported thereby, spring means to positively invert said tray with respect to said carriage to discharge the load therefrom and hold said tray in inverted position after the load is discharged, a latch to normally retain said tray in load carrying position, and an actuating member for releasing said latch, a plurality of discharge stations arranged along said track each having a tripping member adapted to engage said actuating member when in its operative position to release said latch and thereby cause the load to be discharged, and means for moving said actuating member from operative to inoperative position after said latch is released so it will not engage the tripping members at other work stations.

5. A conveyer system including a track, a carriage movable on said track, means for propelling said carriage along said track, a load carrying tray rotatably supported by said carriage, means to rotate said tray with respect to said carriage to discharge the load therefrom, a latch to prevent rotation of said tray, a tripping member movable to and from operative position and adapted to release said latch when in operative position, mechanism for moving said member from its operative position, and means on said carriage for rendering said mechanism operative.

6. A conveyer system including a track, a carriage movable on said track, means for propelling said carriage along said track, a load carrying tray rotatably supported by said carriage, means to rotate said tray with respect to said carriage to discharge the load therefrom, a latch to prevent rotation of said tray, an actuating member for releasing said latch, and a tripping mechanism including a tripping member to engage said actuating member, means for moving said tripping member to operative position, a spring tending to move said tripping member to inoperative position, a latch holding said tripping member in operative position, and means for releasing said latch after said tripping member has engaged said actuating member.

7. A conveyer system including a track, a carriage movable on said track, means for propelling said carriage along said track, a load carrying tray rotatably supported by said carriage, means to rotate said tray with respect to said carriage to discharge the load therefrom, a latch to prevent rotation of said tray, an actuating member for releasing said latch, said actuating member having a roller at one end and being movable to and from operative position, means for moving said actuating member to inoperative position when said latch is released, a tripping mechanism including a cam rail to engage the roller on said actuating member and release said latch, a latch for holding said cam rail in operative position, and means rendered operative by said actuating member for releasing said last mentioned latch.

8. A conveyer system including a track, a carriage movable on said track, means for propelling said carriage along said track, a load carrying tray rotatably supported by said carriage, means to rotate said tray with respect to said carriage to discharge the load therefrom, a latch to prevent rotation of said tray, an actuating member for releasing said latch, means for moving said actuating member to inoperative position when said latch is released, a tripping mechanism including a tripping member to engage said actuating member to release said latch, and means rendered operative by said actuating member to move said tripping member to inoperative position after said latch is released.

9. A conveyer system including a track, a carriage movable on said track, means for propelling said carriage along said track, a load carrying tray rotatably supported by said carriage, means for rotating said tray with respect to said carriage to discharge the load therefrom, a latch to prevent rotation of said tray, a station selector mounted on said carriage and adjustable transversely thereof, a plurality of tripping members positioned in the path of said carriage at different points along said track, each of said tripping members being so arranged transversely of said path to engage the station selector only when said station selector is in longitudinal alignment therewith, whereby said latch is released and the load is discharged, and means for moving said station selector to inoperative position independently of the position of said tray to prevent the latch from being released unless the station selector is reset.

10. A conveyer system including a track, a carriage movable on said track, means for propelling said carriage along said track, a load carrying tray rotatably supported by said carriage, means for rotating said tray with respect to said carriage, a latch to prevent rotation of said tray, an actuating member to release said latch, a tripping member movable to and from operative position and adapted to engage said actuating member when in operative position, resilient means tending to move said tripping member to inoperative position, and an electrical circuit including a pair of limit switches and a solenoid to move said tripping member to operative position when both of said limit switches are closed.

11. A conveyer system including a track, a carriage movable on said track, means for propelling said carriage along said track, a load carrying tray rotatably supported by said carriage, means for rotating said tray with respect to said carriage, a latch to prevent rotation of said tray, an actuating member to release said latch, a tripping member movable to and from operative position and adapted to engage said actuating member when in operative position, resilient means tending to move said tripping member to inoperative position, means for receiving the load discharged from said carriage including a container adapted to move according to the amount of material in said means, and an electrical circuit including a pair of limit switches and a solenoid, said solenoid being adapted to move said tripping member to operative position when both of said limit switches are closed, one of said limit switches being closed only when a loaded carriage approaches said means for receiving the load, the other of said limit switches being closed by movement of said container when the amount of material reaches a predetermined minimum.

12. A conveyer system including a track, a carriage movable on said track, means for propelling said carriage along said track, a load carrying tray rotatably supported by said carriage, means for rotating said tray with respect to said carriage, a latch to prevent rotation of said tray, an actuating member to release said latch, a tripping member movable to and from operative position and adapted to engage said actuating member when in operative position, resilient means tending to move said tripping member to inoperative position, means for receiving the load discharged from said carriage including a container adapted to move according to the amount of material in said means, and an electrical circuit including a pair of limit switches and a solenoid, said solenoid being adapted to move said tripping member to operative position when both of said limit switches are closed, one of said limit switches being closed only when a loaded carriage approaches said means for receiving the load, the other of said limit switches being closed by movement of said container when the amount of material reaches a predetermined minimum, means for holding said limit switches closed, and means for releasing said last mentioned means after the carriage has passed said tripping member.

13. A conveyer comprising a carriage, a load carrying tray rotatably supported by said carriage, a latch for holding said tray in load carrying position, a spring attached to said carriage, a wheel carried by said tray, and a strap connected between said spring and said wheel for inverting said tray when said latch is released to discharge the load therefrom, said strap extending around a portion of the periphery of said wheel whereby the force of said spring rotates the wheel and tray at a substantially constant velocity.

JULUIS A. MEISTER.

CERTIFICATE OF CORRECTION.

Patent No. 2,273,583. February 17, 1942.

JULUIS A. MEISTER.

It is hereby certified that error appears in the printed specification of the above numbered patent requiring correction as follows: Page 2, first column, line 35, after "Pivotally" insert --mounted--; and second column, line 11, before "levers" insert --the--; line 37, for "patch" read --path--; page 3, first column, line 23, for "difference" read --differences--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.